(12) United States Patent
Hiraide et al.

(10) Patent No.: US 11,931,905 B2
(45) Date of Patent: Mar. 19, 2024

(54) FAILURE PREDICTION METHOD AND FAILURE PREDICTION APPARATUS

(71) Applicant: Seiko Epson Corporation, Toyko (JP)

(72) Inventors: Toshinori Hiraide, Fujimi (JP); Yimei Ding, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 223 days.

(21) Appl. No.: 17/216,738

(22) Filed: Mar. 30, 2021

(65) Prior Publication Data
US 2021/0299871 A1    Sep. 30, 2021

(30) Foreign Application Priority Data

Mar. 31, 2020   (JP) ................................ 2020-063884

(51) Int. Cl.
| | | |
|---|---|---|
| *B25J 9/16* | (2006.01) | |
| *B25J 13/00* | (2006.01) | |
| *B25J 13/08* | (2006.01) | |

(52) U.S. Cl.
CPC ............ *B25J 9/1674* (2013.01); *B25J 9/161* (2013.01); *B25J 9/163* (2013.01); *B25J 13/003* (2013.01); *B25J 13/085* (2013.01); *B25J 13/088* (2013.01)

(58) Field of Classification Search
CPC . B25J 9/1674; B25J 9/161; B25J 9/163; B25J 13/003; B25J 13/085; B25J 13/088; B25J 9/1694; G01M 7/02; G01M 13/028; G05B 23/024; G05B 2219/33025; G05B 2219/33296; G05B 2219/34048; G05B 2219/37209; G05B 2219/37351; G05B 2219/37388; G05B 2219/37435; G05B 2219/39529; G05B 23/0283; G05B 2219/40549

See application file for complete search history.

(56) References Cited

U.S. PATENT DOCUMENTS

| | | | | |
|---|---|---|---|---|
| 9,104,650 | B2 * | 8/2015 | Hosek | G05B 23/0283 |
| 9,205,560 | B1 * | 12/2015 | Edsinger | B25J 9/1674 |
| 10,843,341 | B2 * | 11/2020 | Gawlik | G07C 3/08 |
| 10,994,422 | B2 * | 5/2021 | Suzuki | B25J 13/06 |
| 11,215,535 | B2 * | 1/2022 | Huang | B25J 9/1674 |

(Continued)

FOREIGN PATENT DOCUMENTS

| | | |
|---|---|---|
| CN | 109800861 A | 5/2019 |
| JP | 2018-072029 A | 5/2018 |

(Continued)

*Primary Examiner* — Adam R Mott
*Assistant Examiner* — Sagar Kc
(74) *Attorney, Agent, or Firm* — Harness, Dickey & Pierce, P.L.C.

(57) ABSTRACT

A failure prediction method of predicting a failure of a component of a robot including a robot arm having the component and a detection section that detects information on vibration characteristics when the robot arm moves, includes generating a failure prediction model for prediction of the failure of the component by machine learning based on the information on vibration characteristics, and predicting the failure of the component based on an estimated value of failure prediction output by the generated failure prediction model when the information on vibration characteristics is input to the generated failure prediction model.

7 Claims, 8 Drawing Sheets

(56) References Cited

U.S. PATENT DOCUMENTS

| | | | |
|---|---|---|---|
| 11,433,539 B2* | 9/2022 | Kobayashi | G01M 99/005 |
| 2014/0201571 A1* | 7/2014 | Hosek | B25J 9/1674 |
| | | | 714/26 |
| 2017/0031329 A1* | 2/2017 | Inagaki | G06N 3/08 |
| 2018/0188714 A1 | 7/2018 | Cella et al. | |
| 2019/0048988 A1* | 2/2019 | Besser | F16H 25/2015 |
| 2019/0160665 A1 | 5/2019 | Nakanishi et al. | |
| 2019/0258223 A1* | 8/2019 | Oota | B25J 9/1674 |
| 2019/0265657 A1* | 8/2019 | Inagaki | G05B 13/0265 |
| 2019/0344451 A1 | 11/2019 | Miyazawa et al. | |
| 2020/0198128 A1* | 6/2020 | Hatanaka | G05B 23/024 |
| 2020/0209109 A1* | 7/2020 | Liang | G06N 3/044 |
| 2021/0016443 A1* | 1/2021 | Endo | B25J 19/0095 |
| 2021/0031384 A1 | 2/2021 | Hirose et al. | |
| 2021/0148791 A1* | 5/2021 | Huang | B25J 9/1674 |

FOREIGN PATENT DOCUMENTS

| | | |
|---|---|---|
| JP | 2019-100353 A | 6/2019 |
| JP | 2019-523425 A | 8/2019 |
| JP | 2019-155498 A | 9/2019 |
| JP | 2019-198904 A | 11/2019 |
| WO | 2019-167171 A1 | 9/2019 |

* cited by examiner

ANGULAR VELOCITY OF RESIDUAL VIBRATION

FIG. 10

ACCELERATION OF RESIDUAL VIBRATION

FAILURE PREDICTION METHOD AND FAILURE PREDICTION APPARATUS

The present application is based on, and claims priority from JP Application Serial Number 2020-063884, filed Mar. 31, 2020, the disclosure of which is hereby incorporated by reference herein in its entirety.

BACKGROUND

1. Technical Field

The present disclosure relates to a failure prediction method and a failure prediction apparatus.

2. Related Art

Recently, in factories, due to labor cost rise and labor shortage, work manually performed in the past has been increasingly automated by various robots and robot peripherals. For example, a robot disclosed in JP-A-2019-100353 has a robot arm and a drive unit that drives the robot arm. Further, the drive unit has a motor and a reducer.

In the robot, for example, components including the reducer fail with use. As means for predicting the failure, JP-A-2019-100353 discloses a control system that predicts a failure of the reducer using machine learning from a velocity of the robot and iron powder concentration data of grease of the reducer. Accordingly, the control system may derive a recommended time for a maintenance of the reducer.

However, when a prediction method based on the iron powder concentration data of grease of the reducer is used for prediction of a failure of the reducer provided inside of a joint of the robot, it is necessary to disassemble the robot arm and check the reducer at each time. The work takes a lot of trouble.

SUMMARY

A failure prediction method according to an aspect of the present disclosure is a failure prediction method of predicting a failure of a component of a robot including a robot arm having the component and a detection section that detects information on vibration characteristics when the robot arm moves, including generating a failure prediction model for prediction of the failure of the component by machine learning based on the information on vibration characteristics, and predicting the failure of the component based on an estimated value of failure prediction output by the generated failure prediction model when the information on vibration characteristics is input to the generated failure prediction model.

A failure prediction apparatus according to an aspect of the present disclosure is a failure prediction apparatus of predicting a failure of a component of a robot including a robot arm having the component and a detection section that detects information on vibration characteristics when the robot arm moves, including a failure prediction model generation unit that generates a failure prediction model for prediction of the failure of the component by machine learning based on the information on vibration characteristics, and a processing unit that predicts the failure of the component based on an estimated value of failure prediction output by the generated failure prediction model.

DESCRIPTION OF EXEMPLARY EMBODIMENTS

First Embodiment

Figure 1:
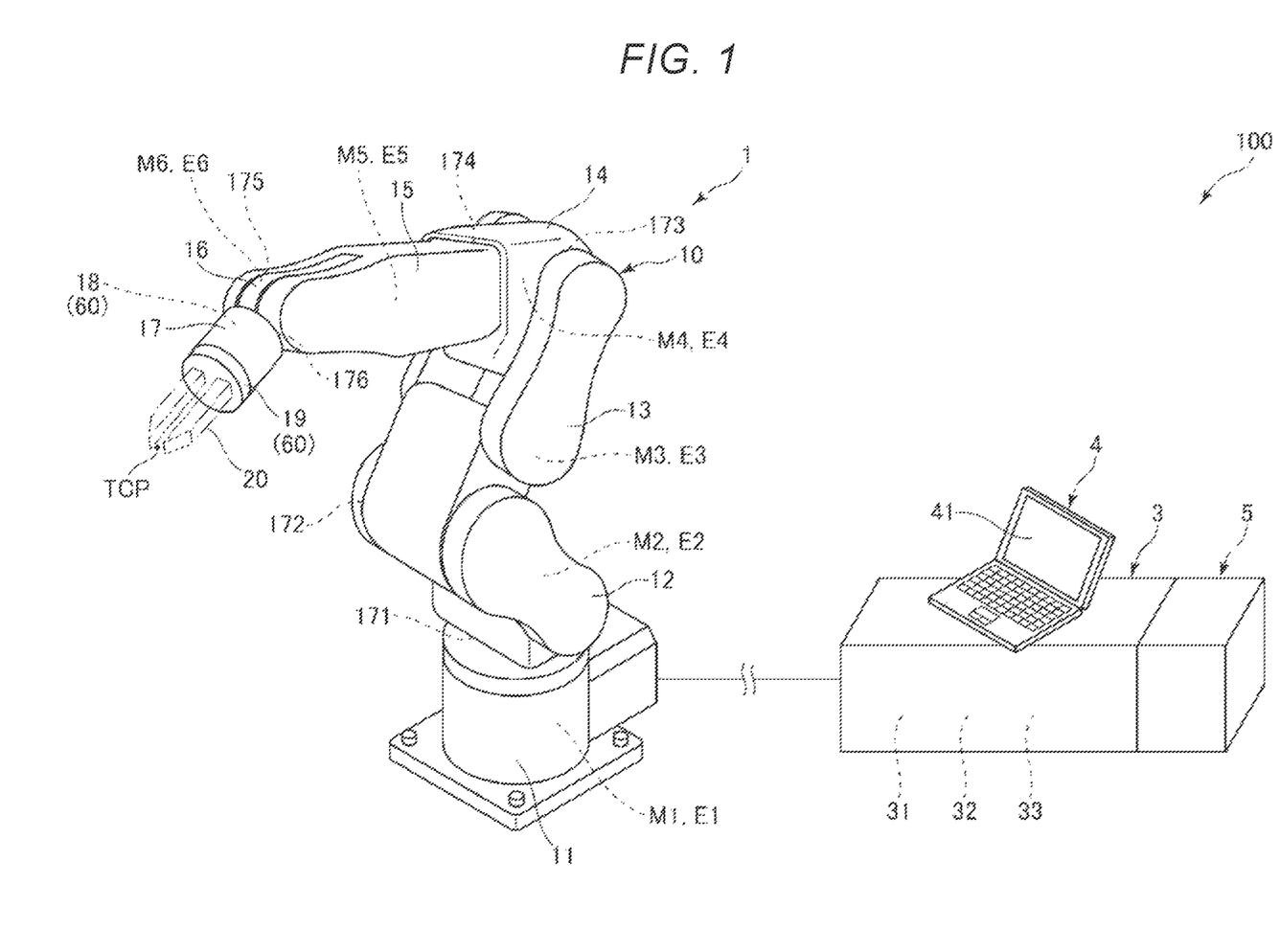
FIG. 1 shows an overall configuration of a robot system of a first embodiment.
Figure 2:
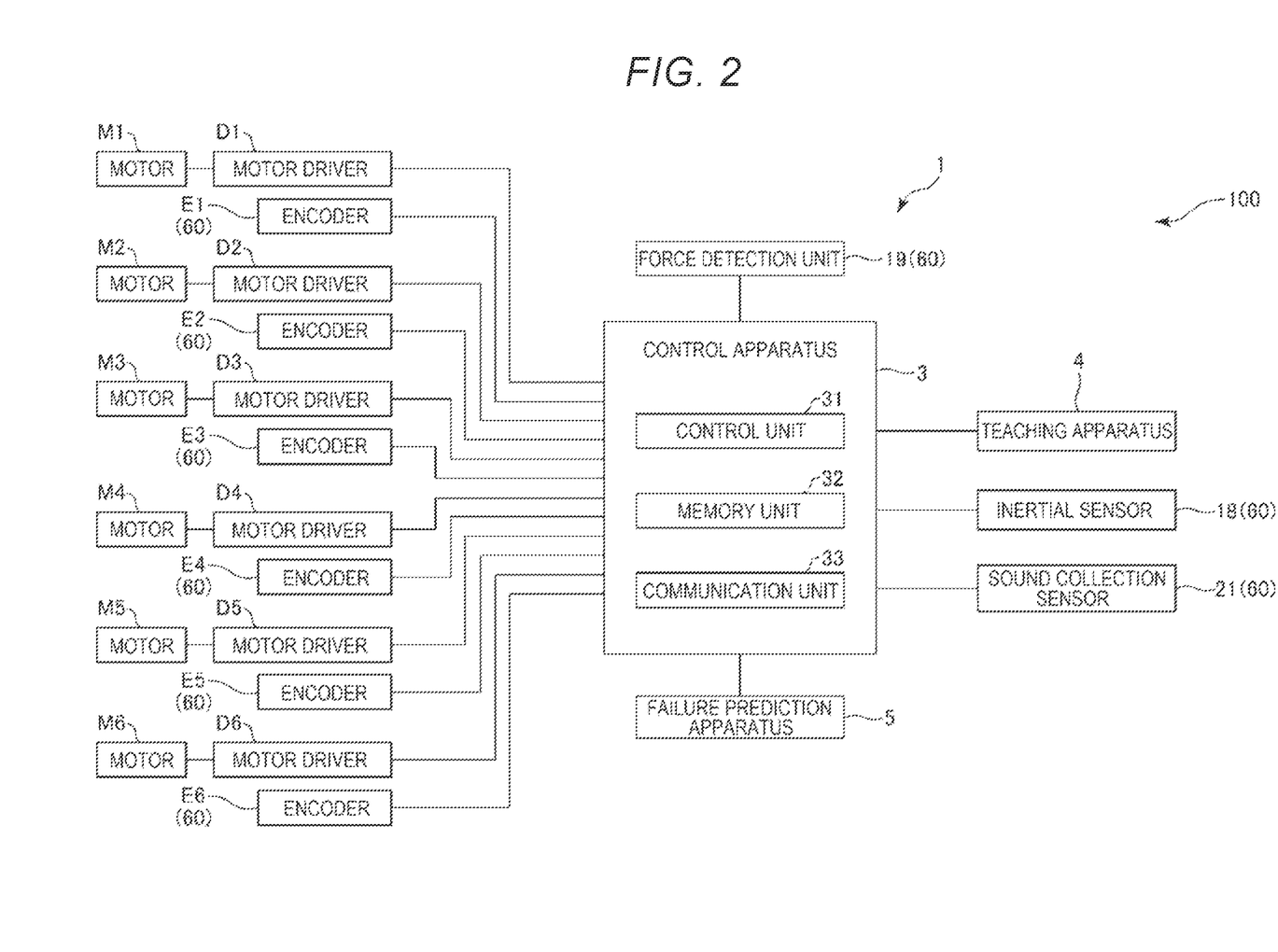
FIG. 2 is a block diagram of the robot system shown in FIG. 1.
Figure 3:
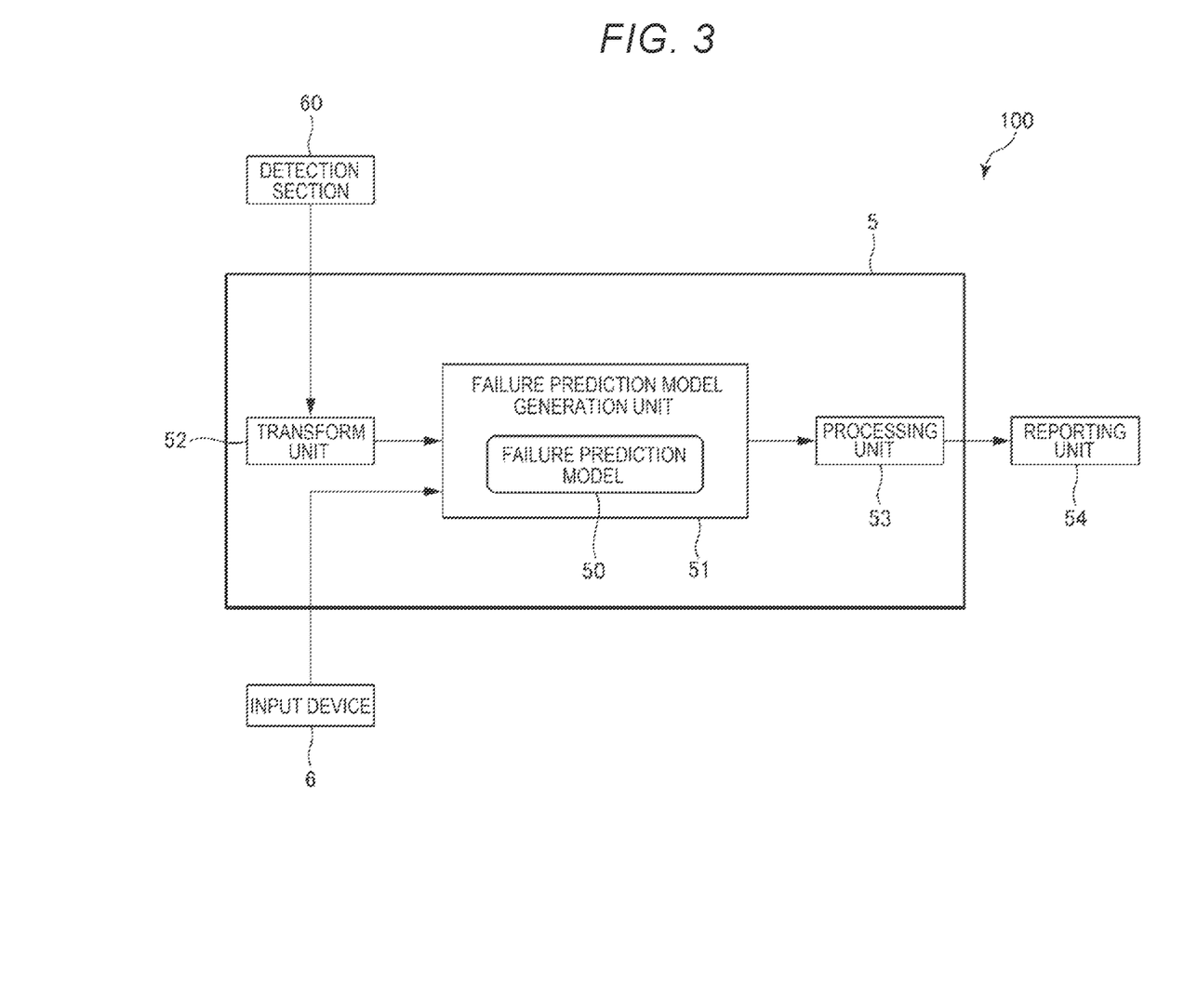
FIG. 3 is a block diagram of a failure prediction apparatus shown in FIG. 1.
Figure 4:
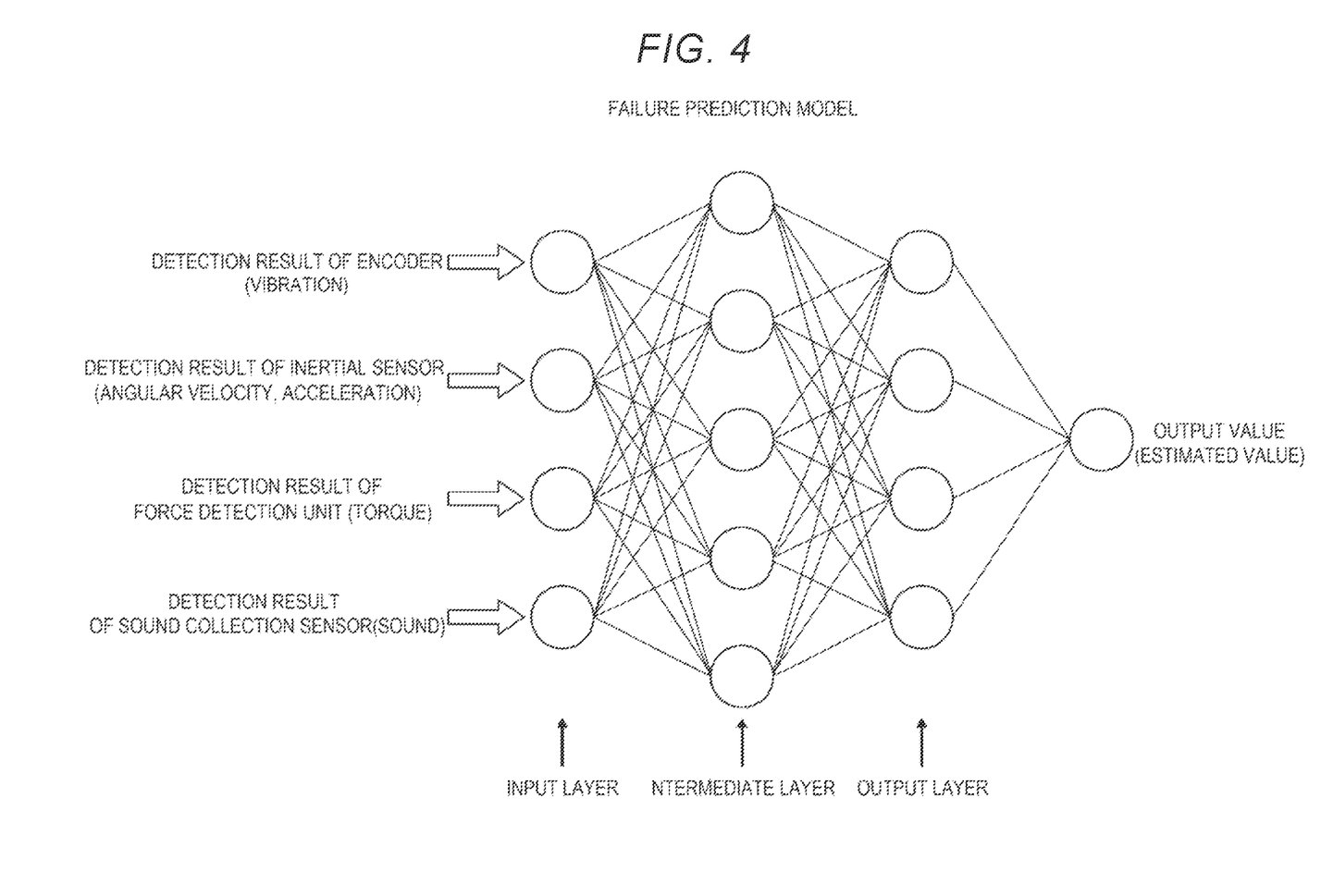
FIG. 4 is a schematic diagram of a neural network as an example of a configuration example of a failure prediction model generation unit shown in FIG. 3.
Figure 5:
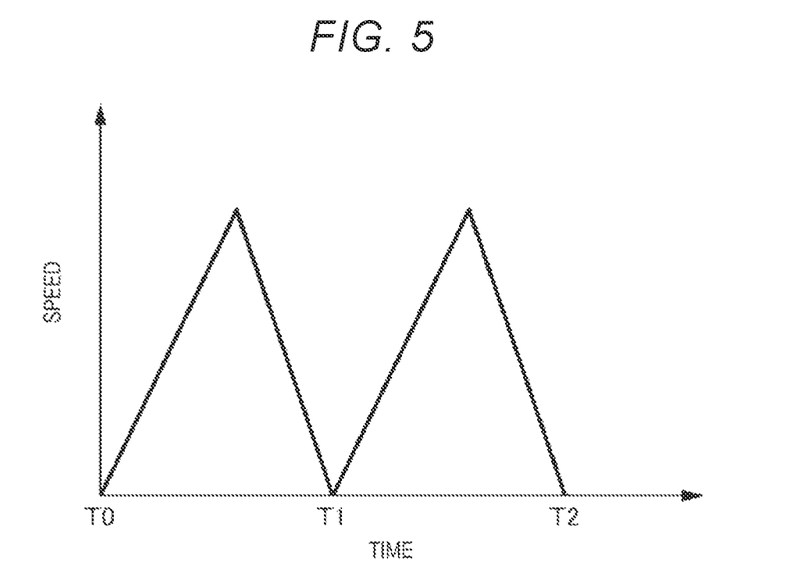
FIG. 5 shows an example of a graph in which a vertical axis indicates an operation speed of a particular motor when the robot arm is controlled to execute a particular movement and a horizontal axis indicates time.
Figure 6:
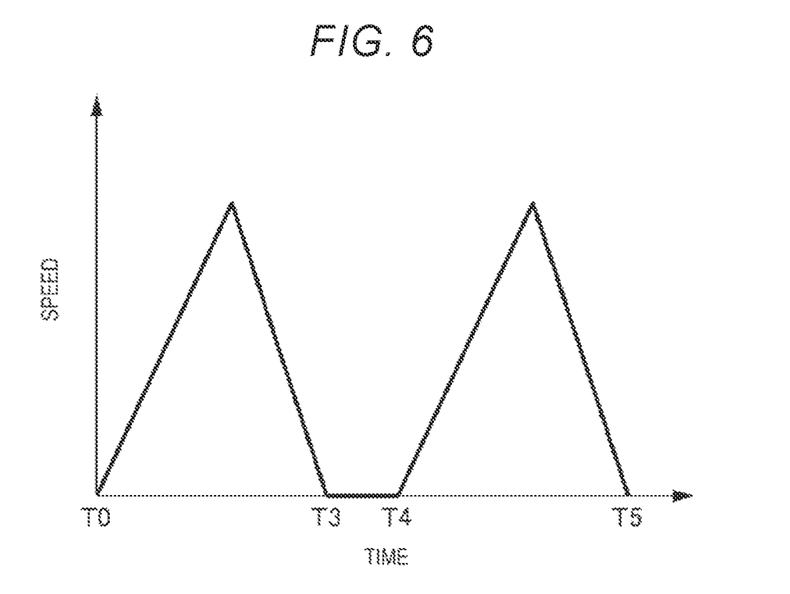
FIG. 6 shows an example of a graph in which a vertical axis indicates an operation speed of a particular motor when the robot arm is controlled to execute a particular movement and a horizontal axis indicates time.
Figure 7:
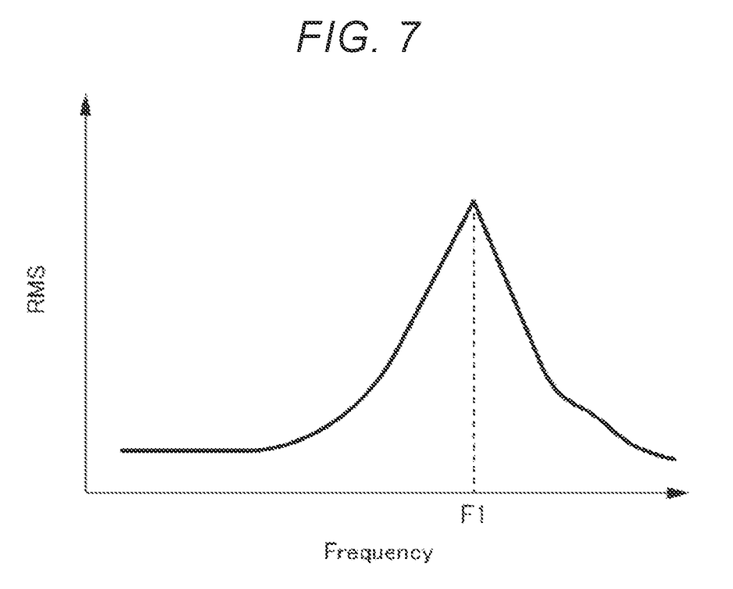
FIG. 7 is a graph in which a horizontal axis indicates a frequency and a vertical axis indicates an effective value of power at each frequency.
Figure 8:
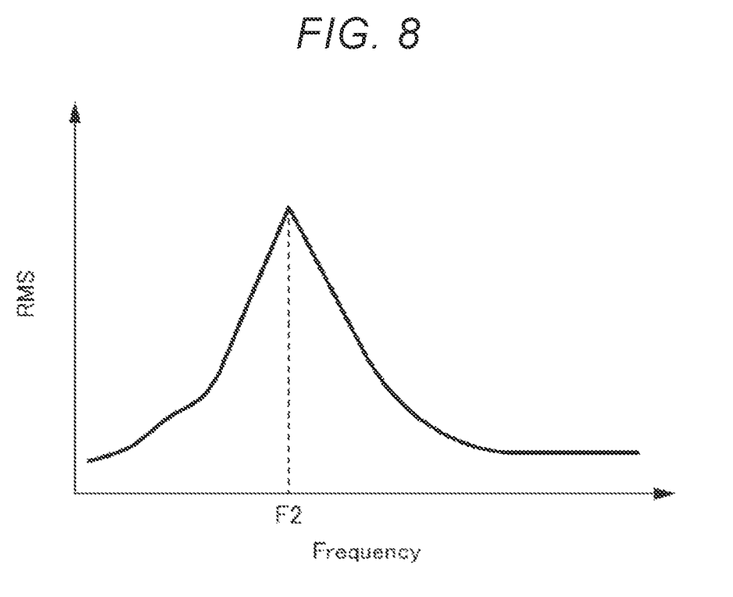
FIG. 8 is a graph in which a horizontal axis indicates a frequency and a vertical axis indicates an effective value of power at each frequency.
Figure 9:
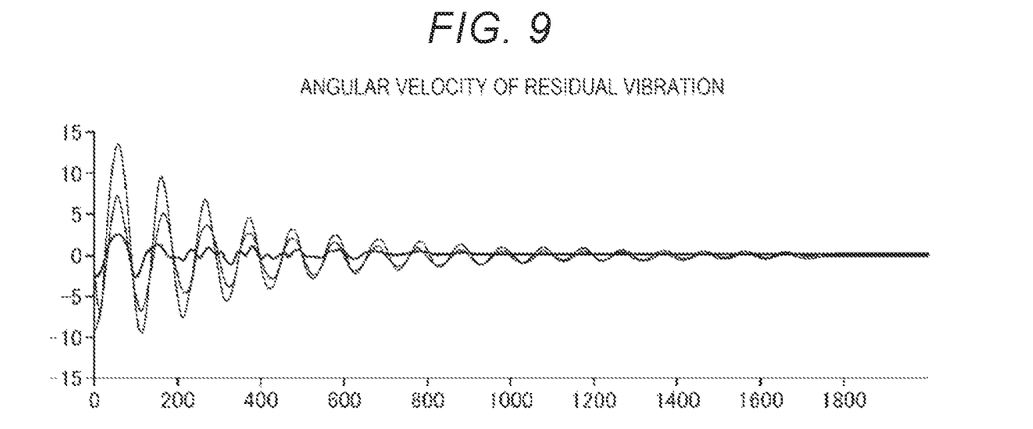
FIG. 9 is a graph showing an example of detection results of an inertial sensor, in which a horizontal axis indicates time and a vertical axis indicates an angular velocity.
Figure 10:
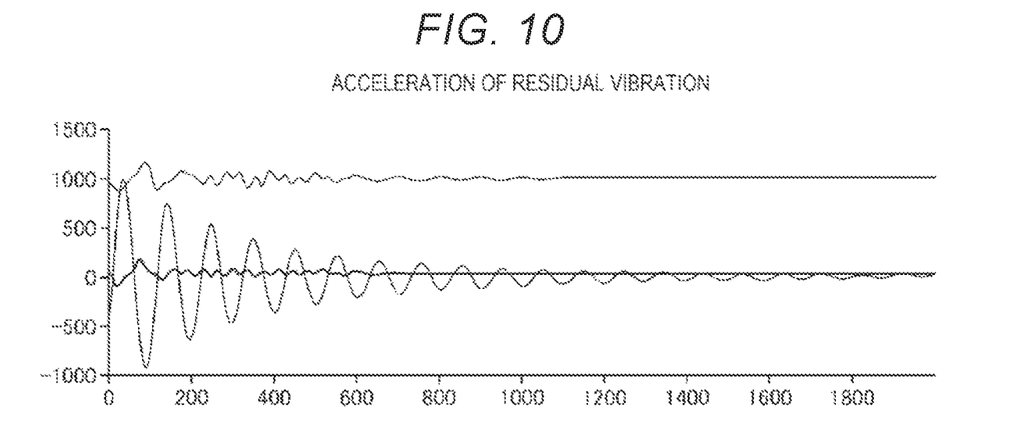
FIG. 10 is a graph showing an example of detection results of the inertial sensor, in which a horizontal axis indicates time and a vertical axis indicates an acceleration.
Figure 11:
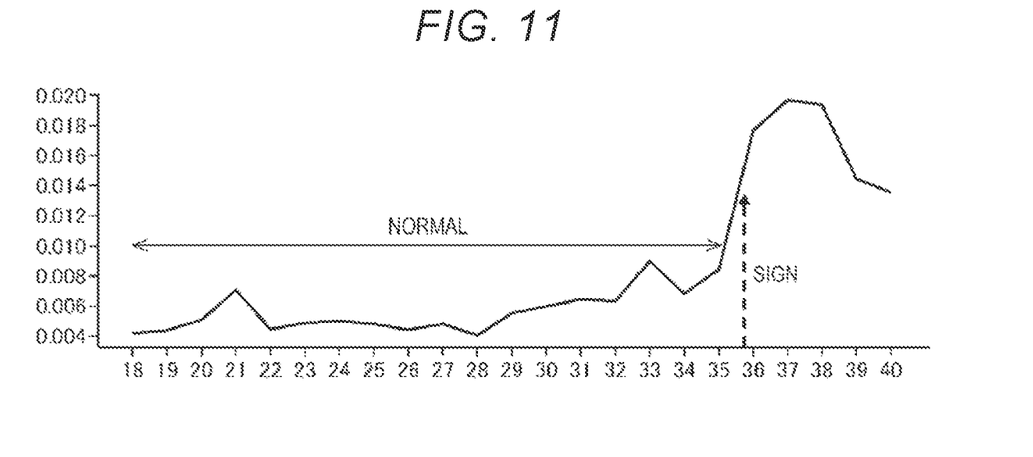
FIG. 11 is a graph in which a horizontal axis indicates a number of times when vibration characteristics are measured and a vertical axis indicates a degree of abnormality.
Figure 12:
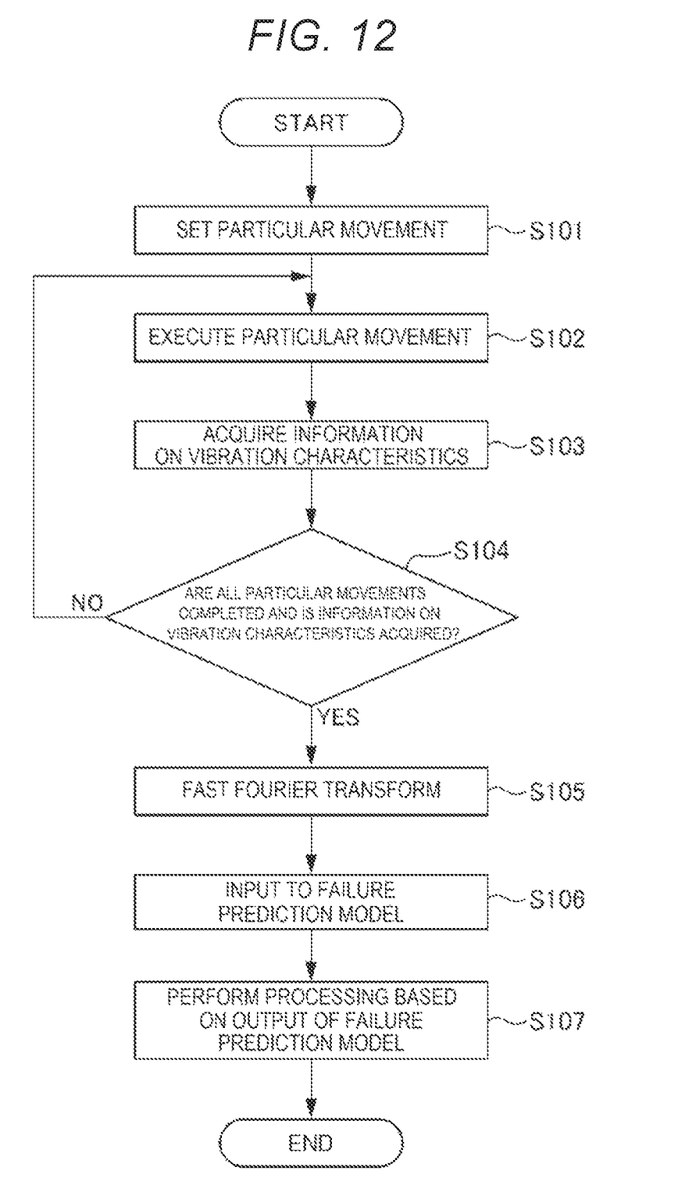
FIG. 12 is a flowchart showing an example of a control operation performed by the robot system shown in FIG. 1.

FIG. 1 shows an overall configuration of a robot system of a first embodiment. FIG. 2 is a block diagram of the robot system shown in FIG. 1. FIG. 3 is a block diagram of a failure prediction apparatus shown in FIG. 1. FIG. 4 is a schematic diagram of a neural network as an example of a configuration example of a failure prediction model generation unit shown in FIG. 3. FIG. 5 shows an example of a graph in which a vertical axis indicates an operation speed of a particular motor when the robot arm is controlled to execute a particular movement and a horizontal axis indicates time. FIG. 6 shows an example of a graph in which a vertical axis indicates an operation speed of a particular motor when the robot arm is controlled to execute a particular movement and a horizontal axis indicates time. FIG. 7 is a graph in which a horizontal axis indicates a frequency and a vertical axis indicates an effective value of power at each frequency. FIG. 8 is a graph in which a horizontal axis indicates a frequency and a vertical axis indicates an effective value of power at each frequency. FIG. 9 is a graph showing an example of detection results of an inertial sensor, in which a horizontal axis indicates time and a vertical axis indicates an angular velocity. FIG. 10 is a graph showing an example of detection results of the inertial sensor, in which a horizontal axis indicates time and a vertical axis indicates an acceleration. FIG. 11 is a graph in which a horizontal axis indicates a number of times when vibration characteristics are measured and a vertical axis indicates a degree of abnormality. FIG. 12 is a flowchart showing an example of a control operation performed by the robot system shown in FIG. 1.

As below, a failure prediction method and a failure prediction apparatus according to the present disclosure will be explained in detail according to preferred embodiments shown in the accompanying drawings. Note that, hereinafter, for convenience of explanation, regarding the robot arm, a base 11 side in FIG. 1 is also referred to as "proximal end" and an opposite side, i.e., an end effector 20 side is also referred to as "distal end".

As shown in FIG. 1, a robot system 100 includes a robot 1, a control apparatus 3 that controls the robot 1, a teaching apparatus 4, and a failure prediction apparatus 5.

First, the robot 1 is explained.

The robot 1 shown in FIG. 1 is a single-arm six-axis vertical articulated robot in the embodiment, and has the base 11 and a robot arm 10. Further, the end effector 20 may be attached to the distal end portion of the robot arm 10. The end effector 20 may be a component element of the robot 1 or not a component element of the robot 1.

Note that the robot 1 is not limited to the illustrated configuration, but may be e.g. a dual-arm articulated robot. Or, the robot 1 may be a horizontal articulated robot.

The base 11 is a supporter that drivably supports the robot arm 10 from the downside and fixed to e.g. a floor of a factory. In the robot 1, the base 11 is electrically coupled to the control apparatus 3 via a relay cable. Note that the coupling between the robot 1 and the control apparatus 3 is not limited to the wired coupling like the configuration shown in FIG. 1, but may be e.g. wireless coupling or coupling via a network such as the Internet.

In the embodiment, the robot arm 10 has a first arm 12, a second arm 13, a third arm 14, a fourth arm 15, a fifth arm 16, and a sixth arm 17, and these arms are sequentially coupled from the base 11 side. Note that the number of the arms of the robot arm 10 is not limited to six, but may be e.g. one, two, three, four, five, seven, or more. The sizes including entire lengths of the respective arms are respectively not particularly limited, but can be appropriately set.

The base 11 and the first arm 12 are coupled via a joint 171. Further, the first arm 12 is pivotable about a first pivot axis parallel to the vertical direction as a pivot center relative to the base 11. The first pivot axis is aligned with a normal of the floor to which the base 11 is fixed.

The first arm 12 and the second arm 13 are coupled via a joint 172. Further, the second arm 13 is pivotable about a second pivot axis parallel to the horizontal direction as a pivot center relative to the first arm 12. The second pivot axis is parallel to an axis orthogonal to the first pivot axis.

The second arm 13 and the third arm 14 are coupled via a joint 173. Further, the third arm 14 is pivotable about a third pivot axis parallel to the horizontal direction as a pivot center relative to the second arm 13. The third pivot axis is parallel to the second pivot axis.

The third arm 14 and the fourth arm 15 are coupled via a joint 174. Further, the fourth arm 15 is pivotable about a fourth pivot axis parallel to the center axis direction of the third arm 14 as a pivot center relative to the third arm 14. The fourth pivot axis is orthogonal to the third pivot axis.

The fourth arm 15 and the fifth arm 16 are coupled via a joint 175. Further, the fifth arm 16 is pivotable about a fifth pivot axis as a pivot center relative to the fourth arm 15. The fifth pivot axis is orthogonal to the fourth pivot axis.

The fifth arm 16 and the sixth arm 17 are coupled via a joint 176. Further, the sixth arm 17 is pivotable about a sixth pivot axis as a pivot center relative to the fifth arm 16. The sixth pivot axis is orthogonal to the fifth pivot axis.

Furthermore, the sixth arm 17 is a robot distal end portion located at the most distal end side of the robot arm 10. The sixth arm 17 may pivot together with the end effector 20 by driving of the robot arm 10.

The robot 1 includes a motor M1, a motor M2, a motor M3, a motor M4, a motor M5, and a motor M6 as drivers and an encoder E1, an encoder E2, an encoder E3, an encoder E4, an encoder E5, and an encoder E6. The motor M1 is provided inside of the joint 171 and relatively rotates the base 11 and the first arm 12. The motor M2 is provided inside of the joint 172 and relatively rotates the first arm 12 and the second arm 13. The motor M3 is provided inside of the joint 173 and relatively rotates the second arm 13 and the third arm 14. The motor M4 is provided inside of the joint 174 and relatively rotates the third arm 14 and the fourth arm 15. The motor M5 is provided inside of the joint 175 and relatively rotates the fourth arm 15 and the fifth arm 16. The motor M6 is provided inside of the joint 176 and relatively rotates the fifth arm 16 and the sixth arm 17.

Further, the encoder E1 is provided inside of the joint 171 and detects the position of the motor M1. The encoder E2 is provided inside of the joint 172 and detects the position of the motor M2. The encoder E3 is provided inside of the joint 173 and detects the position of the motor M3. The encoder E4 is provided inside of the joint 174 and detects the position of the motor M4. The encoder E5 is provided inside of the fifth arm 16 and detects the position of the motor M5. The encoder E6 is provided inside of the sixth arm 17 and detects the position of the motor M6.

The encoders E1 to E6 are electrically coupled to the control apparatus 3 and position information, i.e., amounts of rotation of the motor M1 to motor M6 are transmitted to the control apparatus 3 as electrical signals. Then, the control apparatus 3 drives the motor M1 to motor M6 via motor driver D1 to motor driver D6 (not shown) based on the information. That is, controlling the robot arm 10 refers to controlling the motor M1 to motor M6.

Further, the encoders E1 to E6 also function as vibration detectors that detect vibration applied to the robot arm 10 as will be described later. Note that another vibrometer may be used as a vibration sensor.

An inertial sensor 18 that detects an angular velocity or an acceleration is provided inside of the distal end portion of the robot arm 10. The inertial sensor 18 is not particularly limited, but e.g. a three-axis gyro sensor may be used.

The inertial sensor 18 is provided in the distal end portion of the robot arm 10. In the distal end portion of the robot arm 10, the angular velocity and the acceleration tend to be higher. Accordingly, the inertial sensor 18 is provided in the distal end portion of the robot arm 10, and thereby, the angular velocity or the acceleration may be detected with higher sensitivity. Therefore, as will be described later, a failure prediction of a component may be performed with higher accuracy.

Though not illustrated, when a particular movement, which will be described later, is executed, dedicated inertial sensors different from the inertial sensor 18 are respectively placed in the respective joints 171 to 176.

Further, in the robot 1, a force detection unit 19 that detects a force is detachably placed in the robot arm 10. The robot arm 10 may be driven with the force detection unit 19 placed therein. The force detection unit 19 is a six-axis force sensor in the embodiment. As will be described later, the force detection unit 19 is a torque sensor that detects magnitude of forces on three detection axes orthogonal to one another and magnitude of torque about the three detection axes. The force detection unit 19 is not particularly limited to the six-axis force sensor, but may have another configuration.

The robot system 100 has a sound collection sensor 21. In the illustrated configuration, the sound collection sensor 21 is placed in a position apart from the robot 1. Not limited to the configuration, but the sound collection sensor 21 may be placed in the robot 1. Further, the sound collection sensor 21 is preferably a sensor that can measure high-frequency wave.

The encoders E1 to E6 as vibration sensors, the inertial sensor 18, the force detection unit 19 as the torque sensor, and the sound collection sensor 21 form a detection section 60 that detects information on vibration characteristics when the robot arm moves. In other words, the detection section 60 has the encoders E1 to E6, the inertial sensor 18, the force detection unit 19, and the sound collection sensor 21. The information on vibration characteristics includes information of vibration applied to the robot arm or residual vibration, the angular velocity, the acceleration, torque, sound, etc.

The encoders E1 to E6, the inertial sensor 18, the force detection unit 19, and the sound collection sensor 21 are electrically coupled to the failure prediction apparatus 5, which will be described later, via the control apparatus 3 or directly. Accordingly, the information on vibration characteristics detected by the encoders E1 to E6, the inertial sensor 18, the force detection unit 19, and the sound collection sensor 21 is transmitted to the failure prediction apparatus 5.

The end effector 20 may be detachably attached to the force detection unit 19. In the embodiment, the end effector 20 includes a hand having a pair of claw portions that can move close to and away from each other and grips and releases a workpiece by the respective claw portions. Note that the end effector 20 is not limited to the illustrated configuration, but may be a hand that grips a work object by suction. Or, the end end effector 20 may be a tool such as a polisher, a grinder, a cutter, a driver, or a wrench.

In a robot coordinate system, a tool center point TCP as a control point is set on the distal end of the end effector 20. In the robot system 100, the position of the tool center point TCP is known in the robot coordinate system and the tool center point TCP may be set as a reference for control.

Next, the control apparatus 3 and the teaching apparatus 4 will be explained.

As shown in FIG. 1, in the embodiment, the control apparatus 3 is placed in a position apart from the robot 1. Note that the apparatus is not limited to the configuration, but may be provided inside of the base 11. The control apparatus 3 has a function of controlling driving of the robot 1 and is electrically coupled to the above described respective parts of the robot 1. The control apparatus 3 has a control unit 31, a memory unit 32, and a communication unit 33. These respective units are communicably connected to one another via e.g. a bus.

The control unit 31 includes e.g. a CPU (Central Processing Unit) and reads and executes various programs such as a movement program stored in the memory unit 32. A signal generated in the control unit 31 is transmitted to the respective parts of the robot 1 via the communication unit 33. Thereby, the robot arm 10 may execute predetermined work in a predetermined condition. The memory unit 32 stores various programs etc. that can be executed by the control unit 31. The memory unit 32 includes e.g. a volatile memory such as a RAM (Random Access Memory), a nonvolatile memory such as a ROM (Read Only Memory), and a detachable external memory device. The communication unit 33 transmits and receives signals between the control apparatus 3 and itself using e.g. an external interface such as a wired LAN (Local Area Network) or a wireless LAN.

As shown in FIGS. 1 and 2, the teaching apparatus 4 has a display unit 41 and a function of creating and inputting the movement program to the robot arm 10. The teaching apparatus 4 is not particularly limited to, but includes e.g. a tablet, a personal computer, a smartphone, and a teaching pendant.

In the above described control apparatus 3 and teaching apparatus 4, a vibration application program as below is stored and the vibration application program is executed, and thereby, the information on vibration characteristics of the robot arm 10, which will be descried later, may be obtained.

The vibration application program is a program for driving the robot arm 10 by controlling the robot arm 10 to perform a predetermined particular movement by driving the motor M1 to motor M6.

FIGS. 5 and 6 are the examples of the graphs in which the vertical axis indicates the operation speed of the particular motor when the robot arm 10 is controlled to execute the particular movement and the horizontal axis indicates time. FIG. 5 shows a detection result of the inertial sensor 18 when a particular movement starting from time T0, temporarily stopping at time T1, restarting, and stopping again at time T2 is performed. On the other hand, FIG. 6 shows the operation speed of the particular motor when a particular movement starting from time T0, temporarily stopping at time T3, restarting at time T4, and stopping again at time T5 is performed.

Note that, in the examples shown in FIGS. 5 and 6, the operation speed of the particular motor of the robot arm 10 linearly changes from time T0 to time T1, from time T1 to time T2, from time T0 to time T3, and from time T4 to time T5. Further, the robot arm 10 stops from time T3 to time T4.

The above described operation is performed with respect to each of the motor M1 to motor M6, and thereby, the information on vibration characteristics for prediction of a failure of the reducers provided inside of the joint 171 to joint 176 can be obtained. Note that the particular movement is different with respect to each of the joint 171 to joint 176. The particular movements are performed, and detection results of the encoders E1 to E6, detection results of the inertial sensor 18, detection results of the force detection unit 19, and detection results of the sound collection sensor 21 are input to the failure prediction apparatus 5.

Next, the failure prediction apparatus 5 according to the present disclosure will be explained.

As shown in FIGS. 1 to 3, the failure prediction apparatus 5 is an apparatus that executes a failure prediction method of predicting a failure of a component of the robot arm 10. Note that the component is not particularly limited to, but includes the reducer, the encoder, the motor, a belt, a pulley, and a bearing. Note that a case where the reducer is applied as the component will be explained as below.

The failure prediction apparatus 5 includes GPGPU (General-Purpose computing on Graphics Processing Units) and a large-scale PC cluster. Thereby, high-speed processing may be performed.

Note that, as shown in FIG. 1, the failure prediction apparatus 5 may be formed separately from the control apparatus 3 or incorporated in the control apparatus 3. When the failure prediction apparatus 5 is formed separately from the control apparatus 3, the failure prediction apparatus may be provided in a server on a network via e.g. a communication line such as an Ethernet (registered trademark).

As shown in FIG. 3, the failure prediction apparatus 5 includes a failure prediction model generation unit 51, a transform unit 52, a processing unit 53, and an input device 6.

The failure prediction model generation unit 51 generates a failure prediction model 50 by machine learning. Note that the generation of the failure prediction model 50 by machine learning refers to repeated learning from input data, finding features, tendencies, etc. read from the respective input data, applying the results to new input data and predicting, and generating the failure prediction model 50.

The failure prediction model 50 refers to a model of receiving input values, performing evaluations and determinations, and outputting the results as output values. The input value refers to the information on vibration characteristics of the robot arm 10 and the output value refers to an estimate value of a failure prediction. That is, the failure prediction apparatus 5 learns inherent vibration characteristics of the robot arm 10.

The failure prediction model generation unit 51 may be constructed using e.g. the neural network as shown in FIG. 4. Specifically, the failure prediction model generation unit 51 may be formed to have an input layer, an intermediate layer, and an output layer. The respective information connects to information of the adjacent layers via a network and a larger network is developed. The intermediate layer has a single layer in the illustrated configuration, but preferably has a plurality of layers. Thereby, in the respective layers of the intermediate layer, importance of information may be weighted and a more accurate failure prediction may be performed.

As the neural network, a recurrent neural network may be applied. In the recurrent neural network, chronological information is recursively held, and the network may be regarded as a general neural network by development along the time axis. Further, both the intermediate layer at the previous time and the input at this time are used for learning, and thereby, a network structure in consideration of the chronological information may be obtained.

A learning method in the failure prediction model generation unit 51 includes supervised learning, unsupervised learning, and a combination thereof. In a case of the supervised learning, a large number of data sets of the input value and the output value are prepared and provided to the failure prediction model generation unit 51, and thereby, the features in those data sets may be learned and a model for estimation of a result from input, i.e., a relationship thereof may be inductively gained. In a case of unsupervised learning, learning is performed to reflect the output value or a pass/fail result thereof on the input value. Therefore, even when information on determination of pass/fail of the failure prediction is not provided, an abnormality may be sensed from the separation of the reconstructed output from the input. As a result, a sign of a failure of the component may be clearly sensed. In the recurrent neural network, unlike an ordinary network, an error is propagated to travel backward in time, and learning is performed using a back propagation through time (BPTT) method.

For example, FIG. 11 is the graph in which the horizontal axis indicates the number of times when vibration characteristics are measured and the vertical axis indicates the degree of abnormality. As shown in FIG. 11, at each time when vibration characteristics are measured, the degree of abnormality obtained using the prediction model after learning is associated with the number of times and stored. Then, when the degree of abnormality is equal to or larger than a predetermined value compared to that at the previous time, that may be regarded as a sign of a failure.

The detection results of the encoders E1 to E6, the detection results of the inertial sensor 18, the detection results of the force detection unit 19, and the detection results of the sound collection sensor 21 when the above described particular movements are performed and provided to the robot arm 10 are input to the failure prediction model generation unit 51.

In this regard, the operator provides information to the detection results of the encoders E1 to E6, the detection results of the inertial sensor 18, the detection results of the force detection unit 19, and the detection results of the sound collection sensor 21 using e.g. the input device 6 such as a personal computer, associates the results with the information, and inputs those to the failure prediction model generation unit 51.

The information provided by the operator includes e.g. whether or not the component fails, the recommended time for replacement of the component, and the beginning date of use of the component. Note that the input device 6 may be omitted and the above described input work may be performed using the teaching apparatus 4.

The transform unit 52 fast-Fourier-transforms the detection results of the encoders E1 to E6, the detection results of the inertial sensor 18, the detection results of the force detection unit 19, and the detection results of the sound collection sensor 21 and inputs the transformed data to the failure prediction model generation unit 51. For example, the data representing the relationship between the movement speed of the robot arm 10 and time as shown in FIG. 5 is fast-Fourier-transformed, and thereby, the data as shown in FIG. 7 is obtained. Further, for example, the data representing the relationship between the movement speed of the robot arm 10 and time as shown in FIG. 6 is fast-Fourier-transformed, and thereby, the data as shown in FIG. 8 is obtained. The fast Fourier transform refers to an algorithm for fast discrete Fourier transform. Thereby, feature points of the data shown in FIGS. 5 and 6 may be prominently obtained.

FIGS. 7 and 8 are the graphs in which the horizontal axis indicates the frequency and the vertical axis indicates the effective value of power at each frequency. In the graph shown in FIG. 7, the effective value of the highest power is obtained at a frequency F1 and the power is lower as the frequency is apart from the frequency F1. In the graph shown in FIG. 8, the effective value of the highest power is obtained at a frequency F2 lower than the frequency F1 shown in FIG. 7 and the power is lower as the frequency is apart from the frequency F2.

The power of the respective frequency components differ depending on the waveforms of the speed changes of the particular movements. The particular movement at a higher acceleration with a larger number of high-frequency components may generate residual vibration at a wider range of frequency compared to the particular movement at a lower acceleration with a smaller number of high-frequency components. On the other hand, the particular movement at a lower acceleration applies a smaller force to the robot and has a smaller impact on the hardware of the robot.

In consideration of the above described requirements, a program for the particular movement is created to obtain sufficient power at a necessary frequency in a necessary frequency band for failure prediction of the components, and thereby, an accurate failure prediction may be performed.

Note that the effective values of power at frequencies often differ with respect to each of the joint 171 to joint 176, and these values are preferably experimentally measured in advance.

The detection results of the detection section 60 input to the failure prediction apparatus 5 include not only the speeds of the motors and the following results. FIG. 9 is the graph showing the example of the detection results of the inertial sensor 18, in which the horizontal axis indicates time and the vertical axis indicates the angular velocity. FIG. 10 is the graph showing the example of the detection results of the inertial sensor 18, in which the horizontal axis indicates time and the vertical axis indicates the acceleration. In these graphs, the angular velocities in a direction around the X-axis, a direction around the Y-axis, and a direction around the Z-axis orthogonal to one another are collectively shown.

Further, the graphs shown in FIGS. 9 and 10 show states in which residual vibration is generated after the particular movements end. Condition changes of the components prominently appear in the vibration characteristics of the residual vibration. Accordingly, those are effective for a failure prediction.

The transform unit 52 also fast-Fourier-transforms the data and inputs the transformed data to the failure prediction model generation unit 51. Further, though not illustrated, the unit transforms the data of the detection results of the encoders E1 to E6, the detection results of the force detection unit 19, and the detection results of the sound collection sensor 21 and inputs the transformed data to the failure prediction model generation unit 51.

Then, the failure prediction model generation unit 51 inputs the transformed data as an input value of the failure prediction model 50. Then, an estimated value of failure prediction may be obtained from the output layer. Note that the estimated value of failure prediction is information on a failure prediction result and includes, e.g. information as to whether or not a failure occurs and a score on an estimated time to a failure. Then, the processing unit 53 performs processing of interpreting the result based on the estimated value of failure prediction, determining whether or not a failure occurs or whether or not an abnormality occurs, and reporting the determination result by a reporting unit 54. Note that the determination by the processing unit 53 is performed based on e.g. a reference value or a calibration curve stored in advance.

According to the failure prediction apparatus 5, a failure of the component of the robot arm 10 may be predicted based on the previously accumulated data without disassembly of the robot arm 10. That is, information on whether or not the component of the robot arm 10 fails, the estimated period to a failure, etc. may be calculated. The result is reported, and thereby, the operator may know the information on whether or not the component of the robot arm 10 fails, the estimated period to a failure, etc. without disassembly of the robot arm 10, that is, by a simple method. Further, according to the present disclosure, a failure prediction may be daily performed at times during test operation at activation of the robot 1, during warm-up operation, or the like, and it is unnecessary to change the operation schedule of the robot 1 for a failure prediction.

Note that the reporting unit 54 is not particularly limited to, but includes a monitor, a speaker, and a lamp. Or, the function of the reporting unit 54 may be provided in the teaching apparatus 4.

As described above, the failure prediction apparatus 5 according to the present disclosure predicts a failure of the component of the robot 1 including the robot arm 10 having the component such as the reducer and the detection section 60 that detects the information on vibration characteristics when the robot arm 10 moves. Further, the failure prediction apparatus 5 includes the failure prediction model generation unit 51 that generates the failure prediction model 50 for prediction of the failure of the component by machine learning based on the information on vibration characteristics, and the processing unit 53 that predicts the failure of the component based on the estimated value of failure prediction output by the generated failure prediction model 50. Thereby, without the work of disassembling the robot arm 10 and observing the component in related art, the result of the failure prediction of the component may be known by the simple method.

Further, the processing unit 53 determines whether or not a failure occurs based on the estimated value output by the generated failure prediction model 50. Thereby, the operator may know the estimated value output by the generated failure prediction model 50 in a clear manner.

The component as an object of failure prediction is the reducer placed in the joint of the robot arm 10. The reducer has a particularly mechanically complex configuration and disassembly and assembly are particularly difficult. Therefore, the reducer is used as the object of failure prediction, and thereby, the effect of the present disclosure may be obtained more remarkably.

Next, the example of the control operation performed by the robot system 100 will be explained according to the flowchart shown in FIG. 12. As below, as the example, step S101 and step S102 are executed by the control apparatus 3 or the teaching apparatus 4 and step S103 to step S107 are executed by the failure prediction apparatus 5.

Further, though not illustrated, dedicated inertial sensors different from the inertial sensor 18 are respectively placed in the respective joint 171 to joint 176 before executing step 102.

First, at step S101, a particular movement is set. The setting of the particular movement is performed using the teaching apparatus 4 or the input device 6. For example, as described above, the joint with the component desired to be failure-predicted provided therein is selected and the joint is set to perform the particular movement.

Then, at step S102, the particular movement set at step S101 is executed. Thereby, the robot arm 10 vibrates and the residual vibration is detected using the detection section 60. As described above, the detection section 60 includes the inertial sensors placed in the joint 171 to joint 176, the encoders E1 to E6, the inertial sensor 18, the force detection unit 19 as the torque sensor, and the sound collection sensor 21.

The step S102 is a vibration application step of applying vibration to the robot arm 10. Note that, not limited to the above described configuration, but e.g. a configuration of applying vibration to the robot arm 10 by hitting the robot arm 10 using a hammer or a combination of these configurations may be employed.

Then, at step S103, information on vibration characteristics is acquired. In this regard, information that the joint of the joint 171 to joint 176 for which the particular movement is performed is associated with information on the detected vibration characteristics and input to the failure prediction apparatus 5. The step S103 is an information acquisition step of acquiring information on vibration characteristics.

Then, at step S104, whether or not all particular movements are completed and information on vibration characteristics of all joints is acquired is determined. At step S104, when a determination that information on vibration characteristics of all joints is not acquired is made, the process returns to step S102 and the particular movement is sequentially executed.

The information on vibration characteristics includes information on the angular velocity or the acceleration of the robot arm 10, and the detection section 60 has the inertial sensor 18 and the inertial sensors (not shown) provided inside of the respective joints. Thereby, the information on the angular velocity or the acceleration of the robot arm 10 may be input to the failure prediction model 50 and a more accurate failure prediction may be performed.

As described above, the information on vibration characteristics includes information on torque applied to the robot arm and the detection section 60 has the force detection unit 19 as the torque sensor. Thereby, the information on torque may be input to the failure prediction model 50 and input samples may be further increased. Therefore, a more accurate failure prediction may be performed.

Further, the information on vibration characteristics includes information on movement sound of the robot arm 10 and the detection section 60 has the sound collection sensor 21. Thereby, the information on movement sound may be input to the failure prediction model 50 and input samples may be further increased. Therefore, a more accurate failure prediction may be performed.

At step S104, when a determination that all particular movements are completed and information on vibration characteristics of all joints is acquired is made, at step S105, the input information on vibration characteristics is fast-Fourier-transformed and, at step S106, the transformed data is input to the failure prediction model generation unit 51. Then, the transformed data is input to the failure prediction model 50.

As described above, the information on vibration characteristics input to the failure prediction model 50 is data obtained by fast Fourier transform. Thereby, feature points of the input information may be prominently obtained. Therefore, a failure prediction of the component may be performed more accurately.

As described above, the failure prediction method according to the present disclosure is the method of predicting a failure of the component of the robot 1 including the robot arm 10 having the component such as the reducer and the detection section 60 that detects the information on vibration characteristics when the robot arm 10 moves. Further, the failure prediction method generates the failure prediction model 50 for prediction of the failure of the component by machine learning based on the information on vibration characteristics, and predicts the failure of the component based on the estimated value of failure prediction output by the generated failure prediction model 50 when the information on vibration characteristics is input to the generated failure prediction model 50. Thereby, without the work of disassembling the robot arm 10 and observing the component in related art, the result of the failure prediction of the component may be known by the simple method.

As above, the failure prediction method and the failure prediction apparatus according to the present disclosure are explained based on the illustrated embodiments, however, the present disclosure is not limited to those. The respective steps and the respective parts of the failure prediction method and the failure prediction apparatus may be replaced by arbitrary steps and structures that may exert the same functions. Or, an arbitrary step or structure may be added thereto.

What is claimed is:

1. A failure prediction method for causing a processor to execute a process to predict a failure of a reducer of a joint of a robot arm of a robot, the failure prediction method comprising executing on the processor the steps of:
controlling a motor to repeatedly move the robot arm several times to obtain information on vibration characteristics of the robot arm due to movement of the reducer, the information on the vibration characteristics including detection results of an encoder at the joint, detection results of an inertial sensor attached at a distal end of the robot arm, detection results of a force detection sensor disposed at the robot arm, and detection results of a sound collection sensor;
generating a failure prediction model for prediction of the failure of the reducer by machine learning based on the information on the vibration characteristics; and
predicting the failure of the reducer based on an estimated value of failure prediction output by the generated failure prediction model when the information on the vibration characteristics is input to the generated failure prediction model,
wherein, when a degree of the vibration characteristics obtained at a current time is equal to or more than a predetermined value and is more than a degree of the vibration characteristics obtained at a previous time, the processor is configured to predict an occurrence of the failure of the reducer.

2. The failure prediction method according to claim 1, wherein
the information on the vibration characteristics that is input to the failure prediction model is data obtained by fast Fourier transform.

3. The failure prediction method according to claim 1, wherein
whether or not the failure occurs is determined based on the estimated value output by the failure prediction model.

4. A failure prediction apparatus comprising:
a robot, the robot having:
a robot arm; and
a joint in the robot arm, the joint configured to move the robot arm and having a motor and a reducer; and
a processor configured to be programed to:
control the motor to repeatedly move the robot arm several times to obtain information on vibration characteristics of the robot arm due to movement of the reducer, the information on the vibration characteristics including detection results of an encoder at the joint, detection results of an inertial sensor attached at a distal end of the robot arm, detection results of a force detection sensor disposed at the robot arm, and detection results of a sound collection sensor;
generate a failure prediction model for prediction of the failure of the reducer by machine learning based on the information on the vibration characteristics; and
predict the failure of the reducer based on an estimated value of failure prediction output by the generated failure prediction model when the information on the vibration characteristics is input to the generated failure prediction model,
wherein, when a degree of the vibration characteristics obtained at a current time is equal to or more than a predetermined value and is more than a degree of the vibration characteristics obtained at a previous time, the processor is configured to predict an occurrence of the failure of the reducer.

5. The failure prediction apparatus according to claim 4, further comprising:
- a torque sensor configured to detect a torque value, the torque value corresponding to torque applied to the robot arm,
- wherein the information on the vibration characteristics includes information on the torque applied to the robot arm.

6. The failure prediction apparatus according to claim 4, wherein
- the information on the vibration characteristics includes information on an angular velocity or an acceleration of the robot arm that are the detection results detected by the inertial sensor.

7. The failure prediction apparatus according to claim 4, wherein
- the information on the vibration characteristics includes information on movement sound of the robot arm that are the detection results detected by the sound collection sensor.

* * * * *